Aug. 9, 1966    E. S. WOODHALL ETAL    3,265,549
METHOD AND APPARATUS FOR BUILDING A TIRE
Filed June 6, 1963    2 Sheets-Sheet 2

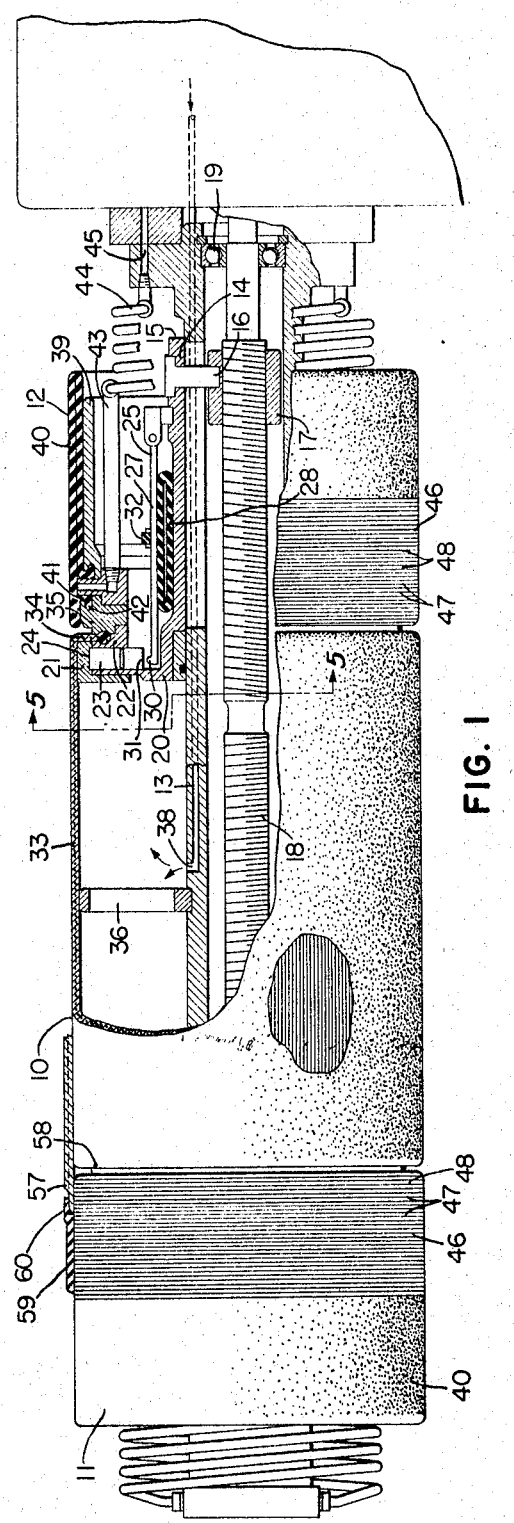
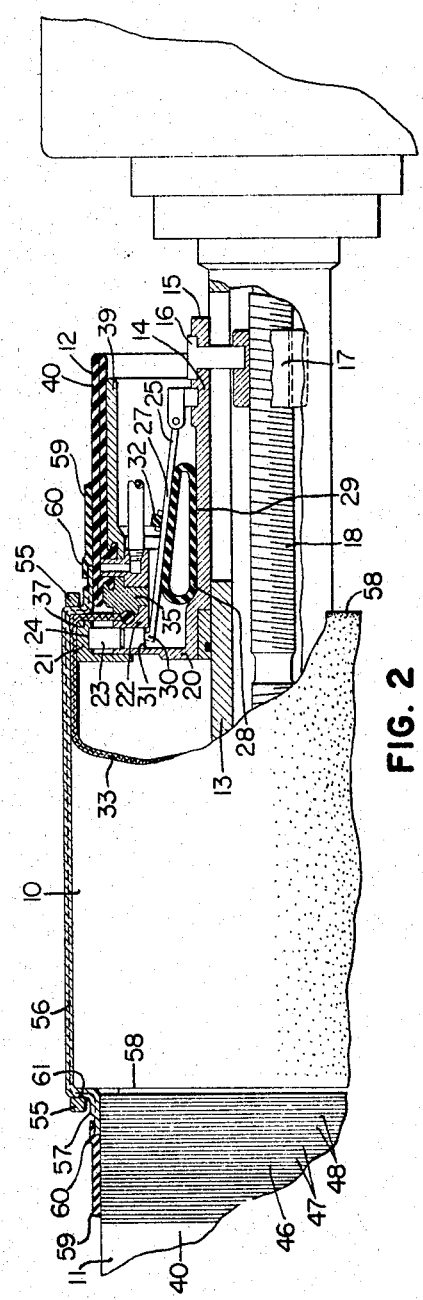

INVENTOR.
EDWIN S. WOODHALL
PAUL E. APPLEBY
BY DENVER C. FOLDEN
J. B. Holden
ATTORNEY

United States Patent Office 3,265,549
Patented August 9, 1966

3,265,549
METHOD AND APPARATUS FOR
BUILDING A TIRE
Edwin S. Woodhall and Paul E. Appleby, Cuyahoga Falls, and Denver C. Folden, Akron, Ohio, assignors to The Goodyear Tire & Rubber Company, Akron, Ohio, a corporation of Ohio
Filed June 6, 1963, Ser. No. 285,931
12 Claims. (Cl. 156—131)

This invention relates to a method and apparatus for building pneumatic tires, particularly useful in connection with the building of such tires wherein the crown of the shaped tire includes a circumferentially inextensible undertread band. Green tires of this type cannot be completely assembled on a flat band and then expanded or shaped for placement in the mold because the undertread is virtually inextensible.

It is an object of this invention to provide a tire building machine in which the tire carcass plies are assembled while the drum is in substantially cylindrical shape, and before applying the bead rings the marginal edges of the plies are moved axially toward the center of the drum as the drum is expanded.

Another object of the invention is to provide a method and apparatus for building a tire in which all of the elements of the tire carcass, except the tread and/or inextensible undertread are asesmbled while in cylindrical shape and thefeafter the carcass is inflated into tire shape for application of the tire tread and/or inextensible undertread or breaker.

A further object of the invention is to provide a tire building machine of the character described having an improved mechanism for expanding the shoulders of the drum.

Other advantages and improvements in the apparatus will become apparent from the following description when read in conjunction with the accompanying drawings, in which FIG. 1 is a partial longitudinal sectional view with parts broken away of the tire building machine of this invention;

FIG. 2 is a view similar to FIG. 1 with the central portion of the drum in expanded position;

Figure 3:
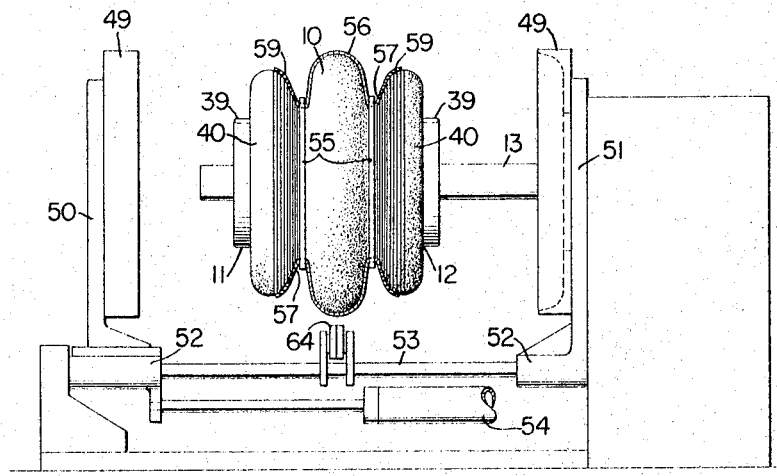
FIG. 3 is a side elevational view showing the tire building apparatus of this invention prior to application of the tread and/or inextensible undertread.

As shown in FIGS. 1 and 2 of the drawings, the tire building machine of this invention comprises a central radially expandable drum 10 and auxiliary ply supports or end drums 11 and 12 concentrically secured to each end of the central drum 10. The central drum is mounted on a shaft 13 and includes at each end thereof a support means or spider 14 which is axially slidable on the shaft 13. The end 15 of the support member or spider 14 has a depending pin 16 which is secured to a threaded nut 17 engaging a threaded driven auxiliary shaft 18. The shaft 18 is rotatably mounted within bearing 19 and is rotated independently of the shaft 13. As the shaft 18 is rotated the nut 17 moves to and fro upon the shaft 18 and in turn moves the spider 14 to and fro in an axial direction upon the shaft 13 for purposes hereinafter more fully described.

Figure 5:
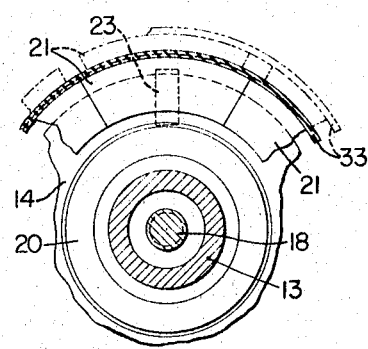
FIG. 5 is a partial sectional view taken along the lines 5—5 of FIG. 1.
Figure 4:
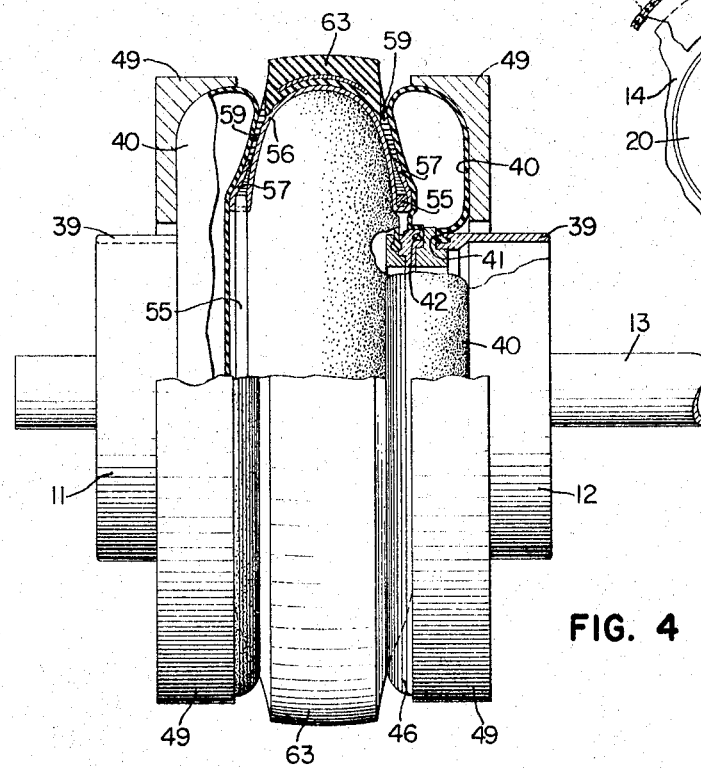
FIG. 4 is a view similar to FIG. 3 with parts in cross section showing the apparatus with the tire completely assembled.

The spider 14 has a radially outwardly extending disc or flange 20 on which are slidably mounted a plurality of rigid members or segments 21, which as shown in FIG. 5 are circularly arranged about the axis of the drum.

Each of the segments 21 is splined or otherwise secured to the disc 20 so that each segment 21 is movable in a radial direction relative to the disc 20 and shaft 13, so that the entire outer peripehry of the segments 21, forming each shoulder of the drum, are radially expandable.

The disc 20 is provided with an outer flange 22 which is suitably bored radially, preferably at the mid-point of each of the segments 21. A reciprocating member or piston 23 is positioned in each bore having an upper surface 24 which contacts the radially inner surface of the segment 21. The pistons 23 are in turn moved in a radially outer direction by means of a pivotable lever or arm 25. Each of the respective arms 25 is pivotably supported at one end 25 on a suitable bracket. The central portion 27 of each of the arms 25 engages an annular inflatable bladder 28, the inner periphery of which is supported on the central portion 29 of the spider 14. As the bladder 28 is inflated each of the arms 25 is pivoted so that the inboard end 30 of the arms 25 engage the bottom surface 31 of the pistons 23 to thereby move the pistons radially outwardly, and in turn, the segments 21 are moved radially outwardly. An extensible band 32 encircles all of the arms 25, preferably at about the mid-point of the bladder 28 in its uninflated position, so that as the bag 28 is deflated each of the arms 25 is suitably biased by the extensible band 32 and is moved back into its neutral position as shown in FIG. 1 of the drawings.

A flexible inflatable cylindrical member or sleeve 33 forms the external surface of the central drum 10 between the segments 21. The sleeve 33 is preferably reinforced with longitudinally extending cords to render it inextensible longitudinally. The ends of the sleeve 33 are provided with radially inwardly extending annular portions 34 which are suitably secured between the annular flange 22 of the member 14 and the flange 35 so as to be fixed radially relative to the axis of the sleeve 33 and fixed for movement with the spider 14 axially of the sleeve 33. The central portion of the sleeve 33 is supported in its uninflated position by means of an annular ring-shaped support 36. Thus the sleeve 33 extends continuously across the central portion of the drum 10 from one shoulder to the other and radially inwardly across the axially outer facing surfaces 37 of the segments 21 and are sealed in air-tight relationship to the flange 22. Thus, the sleeve 33, the members 14, and the shaft 13 form a chamber into which air may be injected through the inlet 38.

The auxiliary end drums 11 and 12 are, respectively, secured to each end of central drum 10 and comprise a rigid cylindrical support 39 having a radially depending flange 35 which engages the annular flange 22 and is suitably secured thereto. An annular inflatable flexible bag 40 is mounted on the support 39, and in uninflated position, the bag 40 has an outer diameter substantially the same as the outer diameter of the central drum 10. The bag 40 is provided with a radially circumferentially continuous portion 41 which in cross section is provided with annular flanges 42 engaged by the flange 35. A hose 43 is connected to the coupling 44 and communicates with a longitudinal opening 45 in the shaft 13 through which air is supplied to the bag 40. The surface of the bag 40 at the inboard end or at the end nearest the drum 10 is provided with an embossment 46 to increase the friction between the bag and the plies during the ply turn-up operation. Preferably, the embossment 46 consists of a series of circumferentially extending alternate grooves 47 and intervening ribs 48.

A lead setter 49 is mounted within each of the bag pushing members 50 and 51 which in turn are supported upon carriages 52. The carriages 52 in turn are slidably mounted upon the shaft 53 and the carriages 52 are actuated in a direction to and fro by means of a suitable cylinder 54.

With the beads 55 in place on the bead setters 49, the layers or plies 56 of rubberized tire fabric are placed around the drum with the endings 57 extending beyond the shoulder 58 of the drum and overlying the bags 40, as shown in FIG. 1 of the drawings. A ply of sidewall stock 59 is positioned so that the inboard end 60 is stitched to the extreme axially outer marginal edge of the plies 56. Air is then admitted through the inlet 38 into the chamber of the drum, and simultaneously into the bladders 28 to actuate the arms 25 and thereby radially outwardly move the segments 21 which act on the inner wall of the sleeve 33 so that the shoulders or outer periphery of the ends of the main drum are radially expanded. At the same time, the shaft 13 is rotated to move the member 14 towards the center of the drum so as axially to contract the drum a distance approximately equal to the distance that the members 21 are expanded radially. This operation forms a shoulder 61 in the ply stock without causing substantial relative movement between the ply ending 57 and sidewall stock 59 relative to the bag 40. After the main drum 10 has been expanded and the members 14 moved axially inwardly to form a shoulder 61 in the plies, the carriages 52 are actuated to move the bead rings 55 into engagement with each of the axially facing surfaces of the shoulders 61 formed in the ply stock. The carriages 52 are then retracted into the position shown in FIG. 3. The bags 40 are then inflated and simultaneously the chamber of the central drum is further inflated. As the bags and central drum are inflated, the members 14 are moved an additional distance towards the center of the drum, as shown in FIG. 3 of the drawings, so that the members 14 are spaced apart a distance approximately equal to the distance between the beads during curing of the tire.

As shown in FIG. 3 of the drawings, the central drum 10 and the plies 56 extending between the beads is formed into a bulbous shape and the ply endings 57, as well as the sidewall stock 59, extend radially outwardly. The ply endings are stitched around the base and axially facing surface of the bead rings 55. With the tire machine in this position the tread 63, and/or inextensible undertread, is applied to the outer surface of the plies and stitched thereto by the stitching wheels 64. After the tread 63 and/or inextensible undertread is applied, the carriages 52 are again actuated to move the bag pushing members 50 and 51 into engagement with the inflated bags 40 to move the bags, and in turn, the ply endings 57 and sidewall stock 59 into engagement with the sidewall of the tire and to stitch the same to the tire carcass. The members 14 are then moved axially outwardly into the position shown in FIG. 1. The chamber of the drum and bags 40 are deflated, and the green tire removed from the tire machine.

While certain representative embodiments and details have been shown for the purpose of illustrating the invention, it will be apparent to those skilled in this art that various changes and modifications may be made therein without departing from the spirit or scope of the invention.

What is claimed is:

1. A tire building machine comprising a flexible generally cylindrical member about which a tire ply may be laid, a set of circularly arranged members disposed coaxially within said cylindrical member adjacent each end thereof and acting on the inner wall thereof, a pair of support means movable axially of said cylindrical member and each supporting one set of said circularly arranged members for movement therewith and for movement of each of said members of said one set generally radially of said cylindrical member and relative to said support means, means fixing the ends of said cylindrical member relative to said pair of support means respectively for movement therewith axially of said cylindrical member, means for moving said pair of support means axially of said cylindrical member and toward each other, and means for moving said circularly arranged members away from the axis of said cylindrical member simultaneous with movement of said support means toward each other.

2. A tire building machine as described in claim 1 in which each of said circularly arranged members is a rigid member reciprocably mounted on one of said support means and in supporting engagement with the interior of said cylindrical member, said means for moving said circularly arranged members including a plurality of pistons reciprocably supported on each of said support means for reciprocation radially of said axis and acting on the respectively associated rigid members for movement of the same outwardly of said axis, and means for moving said pistons outwardly of said axis.

3. A tire building machine as described in claim 2 in which said means for moving said pistons includes a plurality of levers respectively associated with said pistons, one end of each lever acting on the end of the respectively associated piston which is closer to said axis, means pivotally supporting the other end of said lever on the respectively associated support means for movement of said one end of the lever generally radially of said axis and for movement of said lever with the support means axially of said cylindrical member, and means for pivoting said lever away from said axis.

4. A tire building machine comprising a flexible radially expandable cylindrical member about which a tire ply may be laid with the ply projecting beyond the ends of said cylindrical member, a pair of generally annular ply support means disposed coaxially of said cylindrical member and outboard of the ends thereof for the support of the projecting portions of a ply supported by said cylindrical member, means mounting said ply support means for movement coaxially of said cylindrical member, a pair of sets of circularly arranged rigid members disposed concentrically within said cylindrically member axially inwardly but adjacent the ends thereof and acting on the inner cylindrical wall of said cylindrical member, means mounting each set of rigid members for movement with the next adjacent ply support means axially of said cylindrical member and for movement relative to said ply support means radially outwardly of the axis of said cylindrical member, means for moving said rigid members radially outwardly of said axis a predetermined distance, the ends of the cylindrical member being fixed with respect to radial movement relative to said axis and being fixed for movement with said ply support means axially of said cylindrical member, and means for moving each of said ply support means toward the other a distance at least substantially equal to said predetermined distance.

5. A tire building machine as described in claim 4 in which each of said ply support means includes an inflatable member on which a projecting portion of a ply laid over said cylindrical member may be supported, means for inflating said inflatable member, means for exerting on said inflatable member when inflated a force directed at least partially toward said cylindrical member, said cylindrical member being inflatable to a generally bulbous shape, and means for inflating said cylindrical member to a generally bulbous shape subsequent to movement of said rigid members radially outwardly of said axis said predetermined distance and movement of said ply supports toward each other a distance substantially equal to said predetermined distance, said means for moving said ply supports being operable to move said ply supports further toward each other as said cylindrical member is inflated to a bulbous shape.

6. A tire building machine as described in claim 4 in which said means for moving said rigid members includes a plurality of pistons respectively associated with said rigid members, means mounting said pistons for movement radially of said axis, a pivoted lever associated with each of said pistons, one end of each lever acting on the inner end of one of said pistons, and an inflatable annular member associated with the levers associated with the pistons at each end of said cylindrical member and acting on the levers to move the same in a direction corresponding to radially outward movement of said pistons.

7. A tire building machine as described in claim 6 in which each of said levers extends from said one end thereof toward and within the next adjacent ply support means, and means urging each lever in a direction corresponding to radially inward movement of said pistons.

8. A tire building machine as described in claim 6 further comprising a shaft extending coaxially of and through said cylindrical member; means mounting said shaft for rotation relative to said cylindrical member; a pair of support members mounted on said shaft for movement axially thereof and respectively supporting the associated pistons, rigid members, levers, and ply support means disposed at the opposite ends of said cylindrical member and disposed concentrically about said shaft; and means for moving said support members in opposite directions axially of said shaft in response to rotation of said shaft.

9. A tire building machine as described in claim 5 in which said inflatable members are provided with ply engageable embossments on the surfaces thereof for supporting a ply.

10. A method of building a tire comprising forming a substantially cylindrical band of at least one cord reinforced carcass ply and a sheet of sidewall rubber stock secured to each marginal edge of said ply; radially expanding a central portion of said band between the ends of said ply to a substantially cylindrical shape of greater radius and, during the radial expansion of said portion of the band, moving the remaining portions of the band toward the center of the band to provide a pair of bead engageable shoulders at the ends of said central portion and extending generally radially of said band and facing in opposite directions axially outwardly of the band; and engaging a pair of bead rings with the axially outwardly facing surfaces of said shoulders.

11. A method as described in claim 10 further comprising forming said portion of the band into a toric shape subsequent to engagement of said bead rings while at the same time moving the portions of the band disposed outboard of the bead rings radially outwardly of the axis of the band.

12. A method as described in claim 10 in which the distance that the outer ends of each of said remaining portions is moved toward the center of the band is at least substantially equal to the amount of radial expansion of said portion of the band.

References Cited by the Examiner

UNITED STATES PATENTS

| 2,814,331 | 11/1957 | Vanzo et al. | 156—123 |
| 3,078,204 | 2/1963 | Appleby | 156—132 |
| 3,101,289 | 8/1963 | Gilletta et al. | 156—133 |
| 3,125,482 | 3/1964 | Niclas et al. | 156—417 |

FOREIGN PATENTS

| 614,225 | 2/1961 | Canada. |
| 626,948 | 9/1961 | Canada. |

EARL M. BERGERT, *Primary Examiner.*

C. B. COSBY, *Assistant Examiner.*